United States Patent [19]

Ikemori

[11] 4,456,340
[45] Jun. 26, 1984

[54] OPTICAL SYSTEM FOR FOCAL LENGTH CONVERSION

[75] Inventor: Keiji Ikemori, Kanagawa, Japan

[73] Assignee: Canon Kabushiki Kaisha, Tokyo, Japan

[21] Appl. No.: 319,589

[22] Filed: Nov. 9, 1981

[30] Foreign Application Priority Data

Nov. 13, 1980 [JP] Japan ............................ 55-159905

[51] Int. Cl.³ .................................... G02B 15/12
[52] U.S. Cl. ............................................ 350/422
[58] Field of Search ................................. 350/422

[56] References Cited

U.S. PATENT DOCUMENTS 4,239,340 12/1980 Ogino ............................ 350/422
4,253,736 3/1981 Momiyama ................... 350/422
4,340,279 7/1982 Ikemori ......................... 350/422

Primary Examiner—John K. Corbin
Assistant Examiner—Rebecca D. Gass
Attorney, Agent, or Firm—Toren, McGeady and Stanger

[57] ABSTRACT

An optical system has a convertible focal length. A positive lens system having a positive refractive power is supplemented by a negative lens system having a negative refractive power between said positive lens system and an image plane to convert the focal length. The front principal point of the aforesaid negative lens system thereby assumes a position rearwardly of the rear principal point thereof, and is made to lie rearwardly of the rear principal point of the aforesaid positive lens system. The overall length of the aforesaid negative lens system is longer than 0.1 times but shorter than 0.5 times the back focus of the aforesaid positive lens system.

5 Claims, 27 Drawing Figures

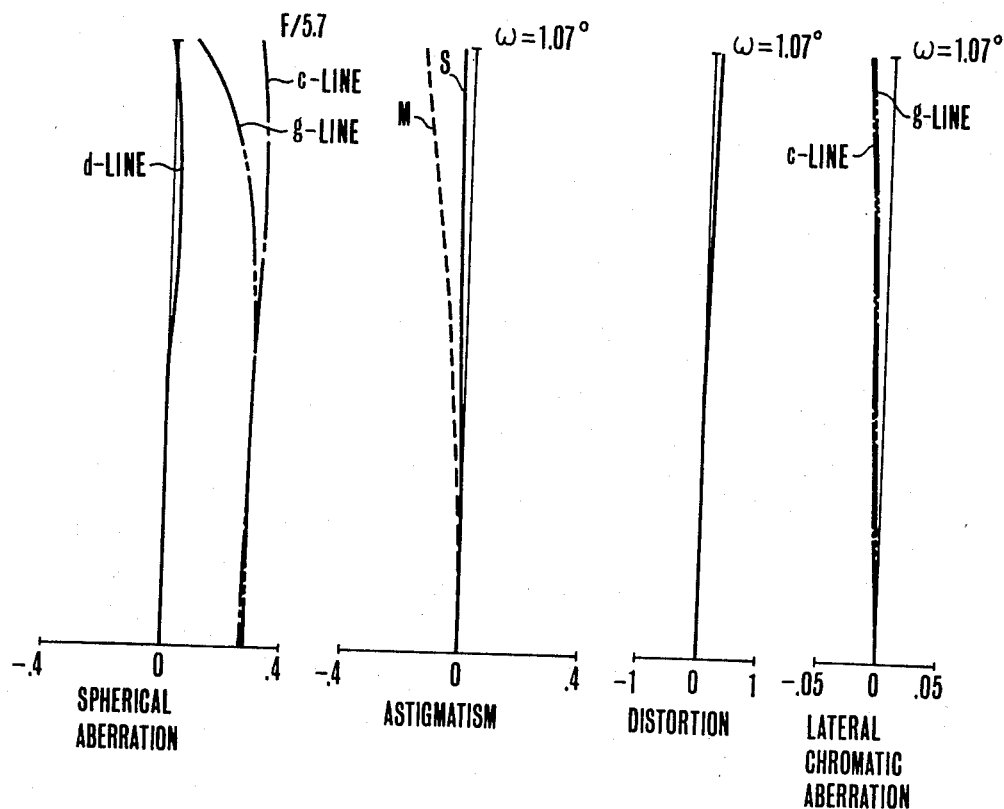

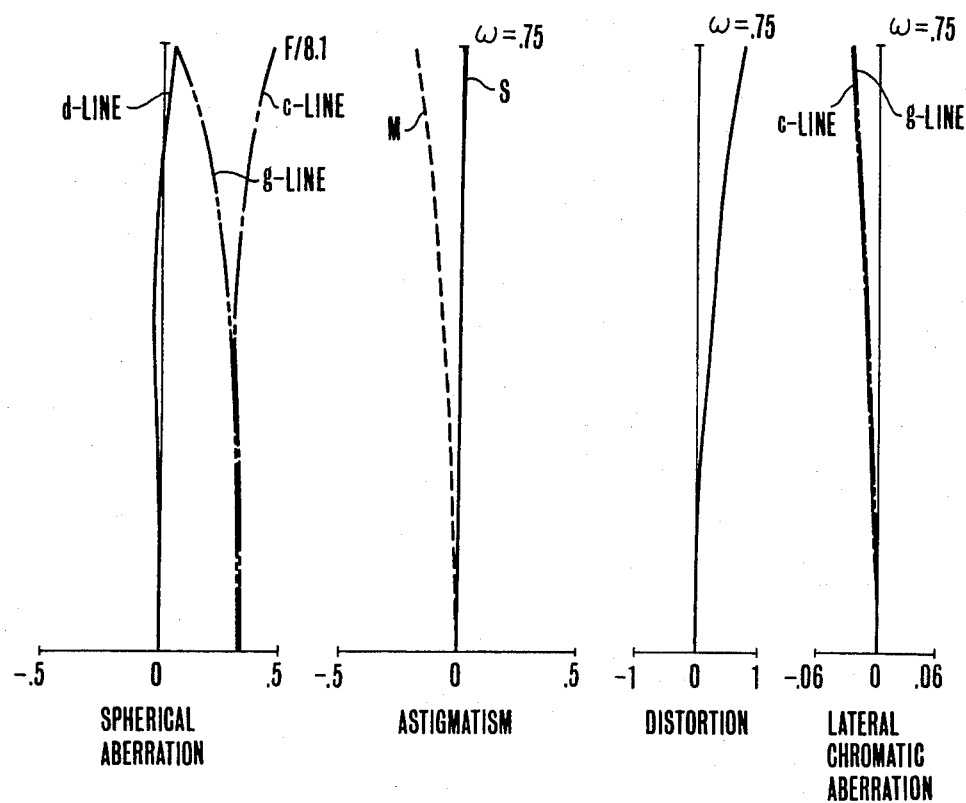

FIG.11a  FIG.11b  FIG.11c  FIG.11d
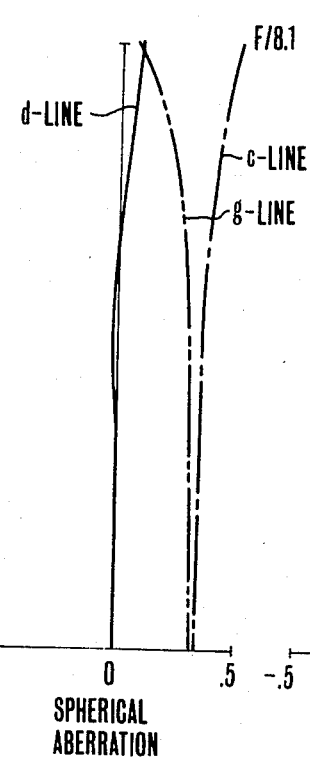
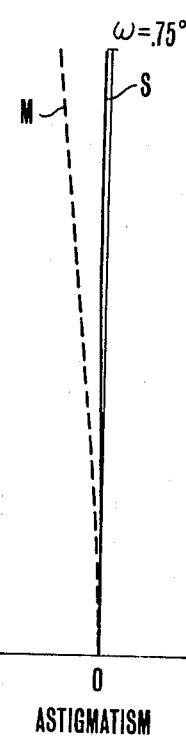
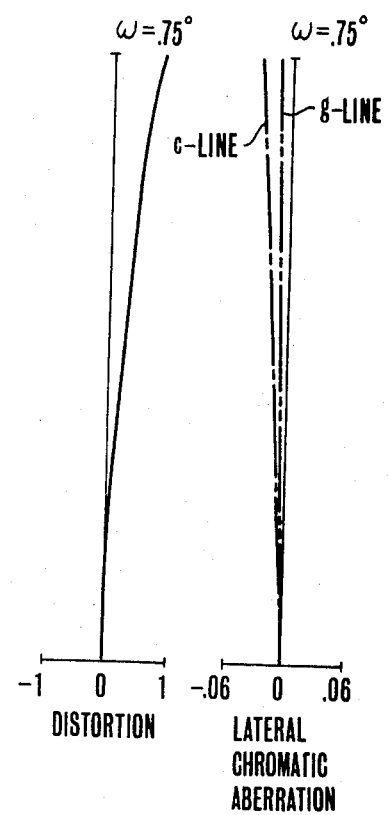

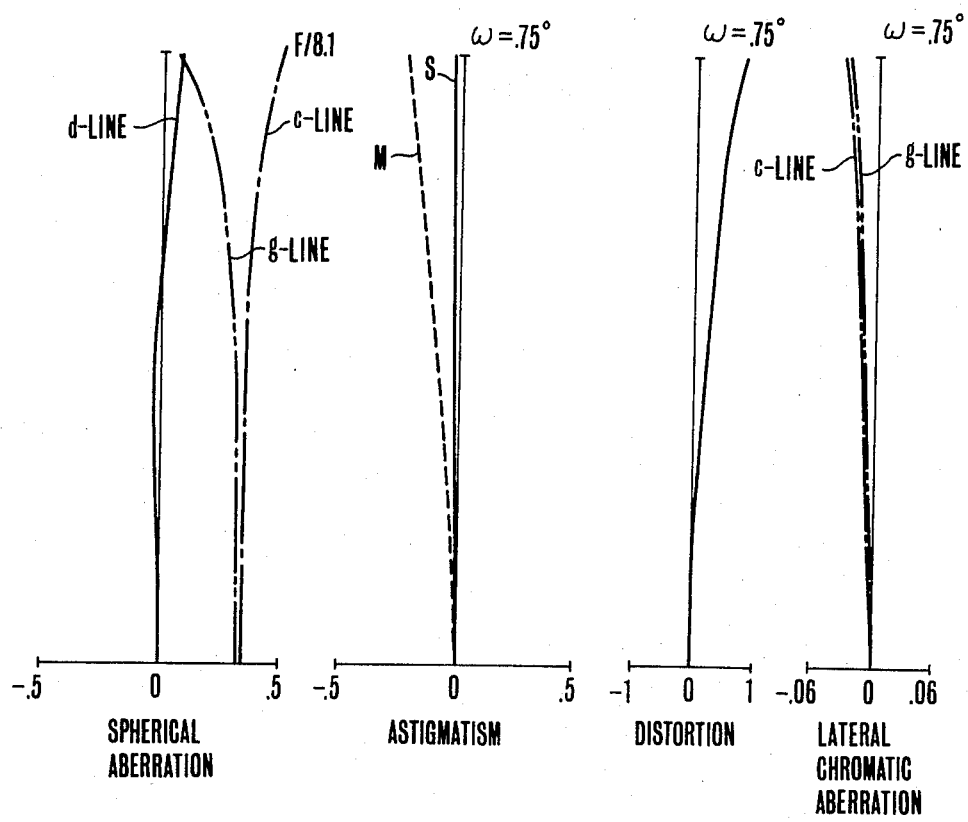

OPTICAL SYSTEM FOR FOCAL LENGTH CONVERSION

BACKGROUND OF THE INVENTION

1. Field of the Invention

This invention relates to optical systems of convertible focal length for increase of the focal length by putting a negative lens system in the rear of a positive lens system.

2. Description of the Prior Art

Conventionally, in order to convert the focal length, in most cases, it has been the common practice to put what is called the rear attachment lens, or rear conversion lens in the rear of a master lens. The principle of conversion of the focal length is depicted in FIG. 1. That is, when a negative lens system f′ having a negative refractive power is arranged in the rear of a positive lens system f having a positive refractive power, as the distance from the front principal point H to rear principal point H′ of the negative lens system, or the principal point interval $\overline{HH'}$ is generally of positive value, the attachment of the negative lens system f′ causes image shift, from a position O for the positive lens system alone, rearwards to a position O′. This is because the negative lens system f′ in most cases takes the form that the front lens group is divergent and the rear lens group is convergent so that the principal point interval $\overline{HH'}$ is apt to be positive. For this reason, it has been very difficult to achieve the coincidence of the position of an image point resulting from the attachment of the negative lens system which has found its general use in the conventional focal length-convertible systems to the rear of the positive lens system with that of an image point resulting from the positve lens system only.

It is known to put the negative lens system in an intermediate space of the master lens system in converting the focal length of the entire system as in U.S. Pat. No. 4,240,697. As for the attachment of the negative lens system to the rear of the master lens system in converting the focal length of the entire system, mention is made of U.S. Pat. Nos. 4,129,359 and 4,154,508.

SUMMARY OF THE INVENTION

It is an object of the present invenion to provide an optical system of convertible focal length in which the focal length is increased by arranging a negative lens system to the rear of a positive lens system, while maintaining the constant position of the image point before and after the addition of the negative lens system.

Another object of the present invention is to provide an optical system of convertible focal length which has achieved good stability of aberration correction against the conversion of the focal length.

BRIEF DESCRIPTION OF THE DRAWINGS

FIGS. 8a to 8d are graphic representations of the various aberrations of the master lens of FIG. 3.

FIGS. 9a to 9d, to 12a to 12d are graphic representations of the various aberrations of the lenses of FIGS. 4 to 7 respectively when attached to the master lens of FIG. 3.

DETAILED DESCRIPTION OF THE PREFERRED EMBODIMENTS

Figure 1:
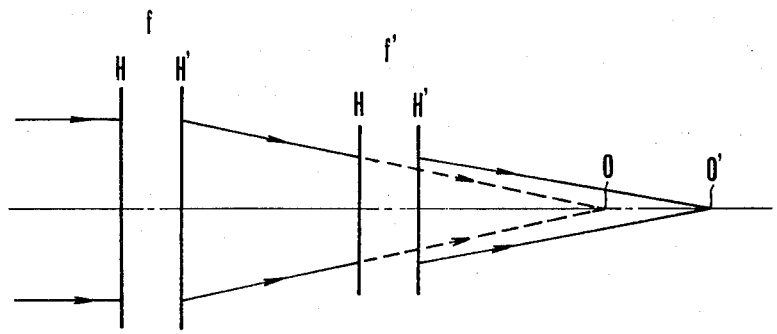
FIG. 1 is a schematic diagram for explanation of the principle of focal length conversion of the conventional optical system.
Figure 2:
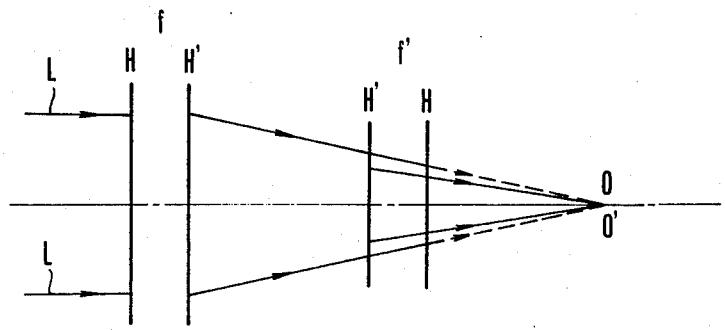
FIG. 2 is a schematic diagram for explaining the principle of focal length conversion of the present invention.
Figure 3:
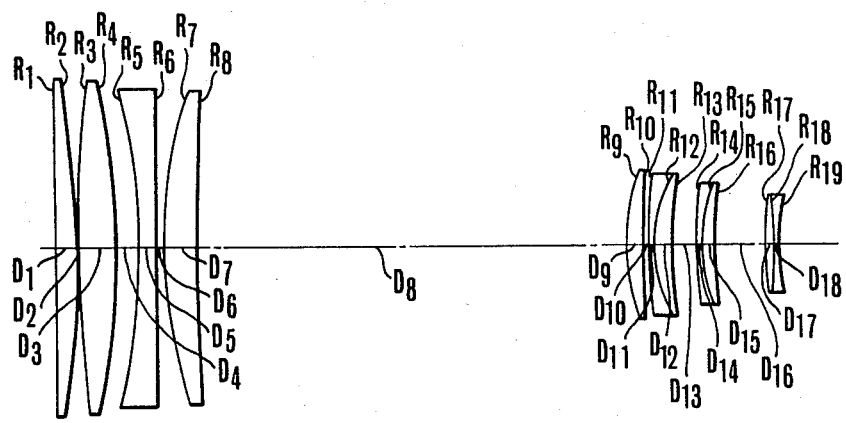
FIG. 3 is a lens block diagram of an example of a specific master lens of the present invention.
Figure 4:
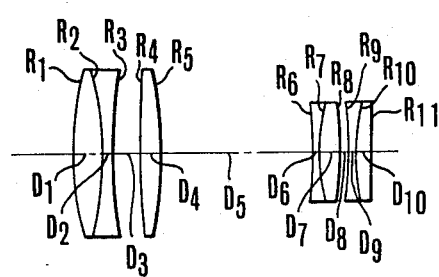
FIGS. 4 to 7 are lens block diagrams of embodiments 1 to 4 of the present invention respectively.
Figure 5:
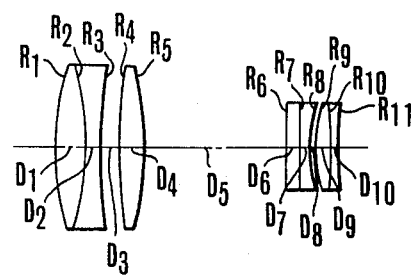
Figure 6:
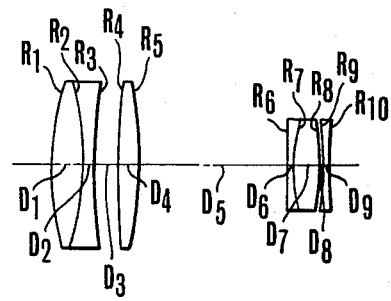
Figure 7:
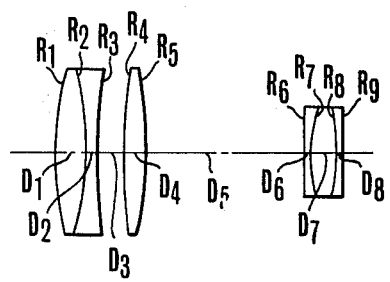
Figures 9A, 9B, 9C, 9D:
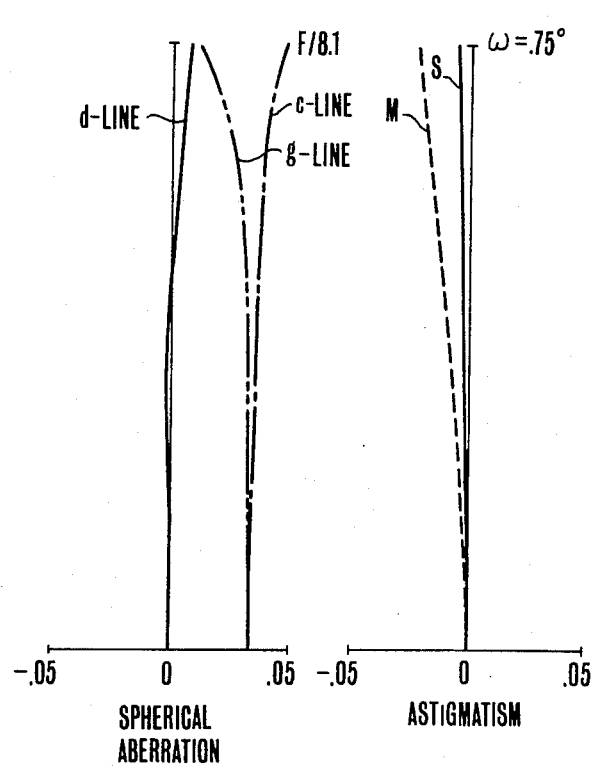

The principle of focal length conversion of the present invention is depicted in FIG. 2, where f is the master or positive lens system, and f′ is the negative lens system attached to effect focal length conversion. It is seen that the relation of the front and rear principal points H and H′ of the negative lens system f′ is inverse to that depicted in FIG. 1. In other words, the front principal plane H lies on the image side of the rear principal plane H′. Therefore, the principal plane interval $\overline{HH'}$ takes a negative value. By adopting such form, it is made possible to cause to coincide the position of an image point for the positive lens system alone with that of an image point O′ for the combined system with the negative lens system. We trace a parallel ray of light L incident upon the positive lens system f through the combined lens system. The arriving ray at the negative lens system f′ will emerge from the rear principal plane H′ at the same height from the optical axis as it aims at on the front principal plane, wherein the emerging ray from the negative lens system f′ makes a smaller angle with the optical axis than the angle of incidence of the arriving ray on the front principal plane of the negative lens system f′, whereby the possibility of bringing the image point O′ into coincidence with the image point O can be achieved.

In order that the value of the principal plane interval $\overline{HH'}$ of the negative lens system f′ is negative, as the negative lens system f′ is divided into two lens groups, it is required that the front group be of positive power, and the rear group of negative power, and that the following condition be satisfied. Now letting $\phi$ denote the refractive power of the negative lens system f′, $\phi1$ the refractive power of the front group, $\phi2$ the refractive power of the rear group, and e′ the interval between the rear principal point of the front group and the front principal point of the rear group, and assuming the front and rear groups to be thin lens systems, the distance, $\Delta1$, of the front principal point of the negative lens system from the front group may be expressed by:

$$\Delta 1 = \frac{e'\phi 2}{\phi}$$

and the distance, $\Delta2$, of the rear principal point of the negative lens system from the rear group may be expressed by:

$$\Delta 2 = \frac{e'\phi 1}{\phi}$$

Therefore, in order to make a negative value of the principal point interval of the negative lens system, the satisfaction of $\Delta 1 - \Delta 2 > e'$ suffices. Therefore, we have $e'(\phi 2 + \phi 1)/\phi > e'$ from this, $$\frac{\phi 2 + \phi 1}{\phi} > 1 \quad (1)$$

That is, what is required is to satisfy the above equation (1)

Next, in the specific embodiments of the present invention to be described later, the refractive power $\phi$ of the negative lens system, the refractive power $\phi 1$ of the front group, the refractive power $\phi 2$ of the rear group and the interval e' between the rear principal point of the front group and the front principal point of the rear group take numerical values listed below:

|  | Example 1 | Example 2 | Example 3 | Example 4 |
|---|---|---|---|---|
| $\phi$ | −0.004901 | −0.004529 | −0.004732 | −0.004683 |
| 1 | 0.005552 | 0.005774 | 0.005544 | 0.005549 |
| 2 | −0.014194 | −0.014076 | −0.013895 | −0.013838 |
| e' | 47.458 | 46.434 | 46.986 | 46.961 |

When the negative lens system having the above various numerical values of factors is arranged in rear of the positve lens system, the focal length can be increased while maintaining the constant position of the image point. In practical examples, when the positive lens system as the master lens system to be described later exists alone, the distance from the 1st lens surface to the image plane is 803.45 m/m. With the addition of the negative lens system, the distance from the 1st lens surface to the image plane is from 803.41 m/m for Example 1 to be described later, 803.41 m/m for Example 2, 803.40 m/m for Example 3 and 803.43 m/m for Example 4, thus being substantially the same.

On the other hand, though the focal length can be increased by arranging the negative lens system having the aforesaid numerical values of the various factors in rear of the positive lens system, the holding of the image point position unchanged leads to the reduction of the telephoto ratio to an extremely small value. For example, in any of the embodiments to be described later, the telephoto ratio is about 0.49.

As the telephoto ratio decreases, the Petzval sum is generally increased to a negative direction, and further the secondary spectrum comes to increase. On this account, in the embodiments of the invention, the front and rear groups of the negative lens system are each provided with a cemented surface of diverging action to prevent the increase of the Petzval sum. This is achieved by using a glass of low refractive index in the positive lens, and a glass of high refractive index in the negative lens. Also the use of a lanthanum dense flint glass of strong abnormal dispersion in the negative lens well corrects the secondary spectrum. Further, the over-correction of spherical aberration resulting from the divergent cemented surface in the front group of the negative lens system is compensated for by constructing the front group from a meniscus doublet lens of forward convexity (in the embodiments, having a negative refractive power) and a bi-convex or positive lens. The above lens configuration can achieve an optical system of convertible focal length which is well corrected for aberrations.

On the other hand, in order to readily incorporate the negative lens system for focal length conversion in the interior of the mounting for the positive lens system which functions as the master lens, it is preferred from the mechanical standpoint that the physical length of the negative lens system lies between at least 1/10 and ½ times the back focus of the positive lens system. This is because, unless the physical length of the negative lens system is longer than 1/10 times the back focus of the positive lens system, it becomes difficult to obtain an optical system which preserves the good optical performance. Also because, unless smaller than ½ times, it becomes difficult to avoid mechanical interference with the lens mounting, and it will result in the size and bulk of the entire lens system being increased.

In the following, the specific embodiments of the present invention are shown. The attachment of one of the negative lens systems shown in Example 1 to Example 4 to the master or positive lens system enables the focal length to be increased about 1.41 times without causing a shift of the image point position. In the following tables of the numerical data, Ri is the radius of curvature of the i-th lens surface counting from the front; Di is the i-th lens thickness or air separation counting from the front, and Ni and $\nu i$ are the refractive index and Abbe number of the glass of the i-th lens element counting from the front respectively.

| Master Lens: | | | | | | |
|---|---|---|---|---|---|---|
| F = 1160 | | FNo. = 1:5.7 | | $2\omega = 2.137$ | | |
| R1 = | 0.0 | D1 = | 15.00 | N1 = 1.48749 | $\nu 1$ = | 70.1 |
| R2 = | −602.340 | D2 = | 1.30 | | | |
| R3 = | 940.000 | D3 = | 25.00 | N2 = 1.49700 | $\nu 2$ = | 81.6 |
| R4 = | −461.600 | D4 = | 15.07 | | | |
| R5 = | −410.140 | D5 = | 11.00 | N3 = 1.78590 | $\nu 3$ = | 44.2 |
| R6 = | −2259.200 | D6 = | 6.59 | | | |
| R7 = | 302.440 | D7 = | 22.50 | N4 = 1.49700 | $\nu 4$ = | 81.6 |
| R8 = | 2074.800 | D8 = | 288.06 | | | |
| R9 = | 123.700 | D9 = | 10.13 | N5 = 1.51118 | $\nu 5$ = | 51.0 |
| R10 = | 539.990 | D10 = | 3.94 | | | |
| R11 = | 311.730 | D11 = | 4.60 | N6 = 1.81600 | $\nu 6$ = | 46.6 |
| R12 = | 83.757 | D12 = | 10.16 | N7 = 1.50137 | $\nu 7$ = | 56.4 |
| R13 = | 225.440 | D13 = | 17.08 | | | |
| R14 = | 236.720 | D14 = | 3.80 | N8 = 1.61340 | $\nu 8$ = | 43.8 |
| R15 = | 87.856 | D15 = | 7.68 | N9 = 1.59270 | $\nu 9$ = | 35.3 |
| R16 = | 206.420 | D16 = | 34.20 | | | |
| R17 = | 324.130 | D17 = | 4.83 | N10 = 1.74000 | $\nu 10$ = | 28.3 |
| R18 = | −2074.800 | D18 = | 3.50 | N11 = 1.71300 | $\nu 11$ = | 53.8 |
| R19 = | 139.590 | | | | | |

EXAMPLE 1

| Focal Length Magnification 1.41X | | | | | | |
|---|---|---|---|---|---|---|
| R1 | 75.621 | D1 | 8.47 | N1 1.48749 | $\nu 1$ | 70.1 |
| R2 | −75.621 | D2 | 2.69 | N2 1.883 | $\nu 2$ | 40.8 |
| R3 | 151.077 | D3 | 7.55 | | | |
| R4 | 198.598 | D4 | 6.08 | N3 1.5927 | $\nu 3$ | 35.3 |
| R5 | −86.991 | D5 | 41.13 | | | |
| R6 | −353.091 | D6 | 2.0 | N4 1.7725 | $\nu 4$ | 49.6 |
| R7 | 44.061 | D7 | 6.32 | N5 1.5927 | $\nu 5$ | 35.3 |
| R8 | −76.101 | D8 | 1.99 | | | |
| R9 | −82.307 | D9 | 2.0 | N6 1.7725 | $\nu 6$ | 49.6 |
| R10 | 59.973 | D10 | 4.0 | N7 1.48749 | $\nu 7$ | 70.1 |
| R11 | 372.075 | | | | | |

| | |
|---|---|
| Focal Length | f = −204.04 |
| Principal Point Interval | HH' = −25.0 |
| Principal Point Distance with Master Lens | E = 1099.08 |
| Surface interval with Master Lens | D = 102.8 |

EXAMPLE 2

| Focal Length Magnification 1.41X | | | | | | |
|---|---|---|---|---|---|---|
| R1 | 79.875 | D1 | 8.0 | N1 1.48749 | $\nu 1$ | 70.1 |

-continued

Focal Length Magnification 1.41X

| R2  | −73.755   | D2  | 4.0   | N2 | 1.883  | ν2 | 40.8 |
|-----|-----------|-----|-------|----|--------|----|------|
| R3  | 151.577   | D3  | 5.33  |    |        |    |      |
| R4  | 152.661   | D4  | 7.0   | N3 | 1.5927 | ν3 | 35.3 |
| R5  | −88.805   | D5  | 39.95 |    |        |    |      |
| R6  | 1121.172  | D6  | 4.0   | N4 | 1.5927 | ν4 | 35.3 |
| R7  | −579.803  | D7  | 2.5   | N5 | 1.804  | ν5 | 46.6 |
| R8  | 39.107    | D8  | 1.59  |    |        |    |      |
| R9  | 40.541    | D9  | 4.5   | N6 | 1.5927 | ν6 | 35.3 |
| R10 | −127.316  | D10 | 2.0   | N7 | 1.804  | ν7 | 46.6 |
| R11 | 120.177   |     |       |    |        |    |      |

$$F = -220.82$$
$$\overline{HH'} = -26.91$$
$$E = 1094.28$$
$$D = 93.07$$

EXAMPLE 3

Focal Length Magnification 1.41X

| R1  | 79.113    | D1 | 8.5   | N1 | 1.48749 | ν1 | 70.1 |
|-----|-----------|----|-------|----|---------|----|------|
| R2  | −77.608   | D2 | 2.95  | N2 | 1.883   | ν2 | 40.8 |
| R3  | 150.351   | D3 | 6.61  |    |         |    |      |
| R4  | 164.209   | D4 | 6.23  | N3 | 1.5927  | ν3 | 35.3 |
| R5  | −92.557   | D5 | 41.28 |    |         |    |      |
| R6  | −2002.705 | D6 | 1.71  | N4 | 1.804   | ν4 | 46.6 |
| R7  | 38.252    | D7 | 7.0   | N5 | 1.5927  | ν5 | 35.3 |
| R8  | −79.906   | D8 | 1.0   |    |         |    |      |
| R9  | −86.621   | D9 | 1.7   | N6 | 1.7859  | ν6 | 44.2 |
| R10 | 129.063   |    |       |    |         |    |      |

$$f = -211.34$$
$$\overline{HH'} = -25.88$$
$$E = 1096.94$$
$$D = 101.3$$

EXAMPLE 4

Focal Length Magnification 1.41X

| R1 | 77.605    | D1 | 8.52  | N1 | 1.48749 | ν1 | 70.1 |
|----|-----------|----|-------|----|---------|----|------|
| R2 | −77.605   | D2 | 2.81  | N2 | 1.883   | ν2 | 40.8 |
| R3 | 139.818   | D3 | 8.06  |    |         |    |      |
| R4 | 162.636   | D4 | 6.15  | N3 | 1.5927  | ν3 | 35.3 |
| R5 | −89.999   | D5 | 43.94 |    |         |    |      |
| R6 | −1867.407 | D6 | 1.71  | N4 | 1.804   | ν4 | 46.6 |
| R7 | 38.561    | D7 | 7.0   | N5 | 1.5927  | ν5 | 35.3 |
| R8 | −100.778  | D8 | 1.7   | N6 | 1.804   | ν6 | 46.6 |
| R9 | 143.98    |    |       |    |         |    |      |

$$f = -213.54$$
$$\overline{HH'} = -26.18$$
$$E = 1096.24$$
$$D = 96.95$$

What is claimed is:

1. An optical system of which the focal length is converted by attaching a negative lens system having a negative refractive power to a positive lens system having a positive refractive power in between said positive lens system and an image plane, having the following conditions:
   the front principal point of said negative lens system lies on the image side of the rear principal point thereof, and on the image side of the rear principal point of said positive lens system; and
   the overall length of said negative lens system being longer than 0.1 times and shorter than 0.5 times the back focus of said positive lens system.

2. An optical system according to claim 1, wherein, when said negative lens system is attached to said positive lens system, the resultant image plane position is almost the same as the image plane position for said positive lens system alone.

3. An optical system according to claim 1, wherein said negative lens system has two lens groups, from front to rear, a positive front group and a negative rear group, and in both the lens groups there is at least one cemented surface of diverging action.

4. An optical system according to claim 3, wherein said front lens group of said negative lens system has, from front to rear, a cemented meniscus lens of forward convexity, and a bi-convex positive lens.

5. In the optical system of claim 4,
   said negative lens system consists of two lens groups, or, from front to rear, a positive front group and a negative rear group, satisfying the following condition:

$$\frac{\phi_1 + \phi_2}{\phi} > 1$$

where $\phi$ is the refractive power of said negative lens system, and $\phi_1$ and $\phi_2$ are the refractive powers of said front and said rear groups respectively.

* * * * *